United States Patent [19]
Ohtani

[11] 3,807,533
[45] Apr. 30, 1974

[54] FRICTION PIECE FOR BICYCLE RIM BRAKES
[75] Inventor: Kiyoshi Ohtani, Ageo, Japan
[73] Assignee: Bridgestone Cycle Industry Co., Ltd., Tokyo, Japan
[22] Filed: Feb. 18, 1972
[21] Appl. No.: 227,467

Related U.S. Application Data
[63] Continuation of Ser. No. 4,343, Jan. 20, 1970, abandoned.

[30] Foreign Application Priority Data
Aug. 15, 1969 Japan.............................. 44-64205

[52] U.S. Cl.............. 188/73.1, 188/24, 188/250 B, 188/251 A
[51] Int. Cl............................................ F16d 65/02
[58] Field of Search ........... 188/250 B, 250 E, 264, 188/264 A, 264 AA, 251 A, 251 R, 1 B, 24, 73.1, 73.5

[56] References Cited
UNITED STATES PATENTS
1,716,090  6/1929  Schmidt .......................... 188/250 E
3,188,418  6/1965  Pino................................ 188/24 X Primary Examiner—George E. A. Halvosa
Attorney, Agent, or Firm—Fleit, Gipple & Jacobson

[57] ABSTRACT

A friction piece for bicycle rim brakes, which consists of a body made of natural or synthetic rubber, for instance in an elongated shape with a trapezoidal lateral cross section. A frictional contact surface is formed on a part of the periphery of the body so as to be engageable with a bicycle rim. A plurality of mutually spaced lateral holes are bored in said body in parallel with the frictional contact surface in the proximity thereof.

6 Claims, 12 Drawing Figures

PATENTED APR 30 1974

3,807,533

INVENTOR
KIYOSHI OHTANI

FRICTION PIECE FOR BICYCLE RIM BRAKES

This is a continuation, of application Ser. No. 4,343 filed Jan. 20, 1970, now abandoned.

This invention relates to a friction piece for bicycle rim brakes.

Conventional friction pieces for bicycle rim brakes have a shortcoming in that when being wetted with water their braking power is greatly reduced as compared with that when being dry. For example, when four frictional pieces are used, in total, at the front and rear wheels of a bicycle, the wet braking power is in a range of 0.11G to 0.204G (G being the terrestrial gravitational attraction).

In view of the fact that the braking power of commonly used automobile brakes is 0.4G or larger, it is rather dangerous to allow automobiles and bicycles to run on a road side-by-side with different braking powers. One way of eliminating such danger is to increase the braking power of bicycles under wet conditions. An object of the present invention is to meet such need of improving the wet braking power of bicycles.

Known friction pieces for bicycle rim brakes are in the form of blocks made of natural or synthetic rubber, and drain undulations or drain ridges are formed on that surface of the friction pieces which come in contact with the bicycle rim, for the purpose of draining water from the contact surface between the friction piece and the rim. With such drain undulations or ridges, however, the braking power of the friction pieces cannot be improved to a desired level.

As regards the material for the friction pieces, a number of studies have been made, but no new material has been found yet which is better than natural or synthetic rubber in dry braking power and abrasion resistance. Accordingly, it is a current practice to test various properties, such as hardness, coefficient of friction, and abrasion resistance, of natural or synthetic rubbers of different compositions, so that the best available rubber material is chosen by the tests.

The reasons for the aforesaid loss of braking power of known friction pieces upon wetting are believed to be due to various properties of water detrimental to braking power, such as larger specific heat, large intermolecular force, and large surface tension.

It is, however, noticed that the degree of reduction of braking power of wet friction pieces varies greatly, depending on the shape of the individual friction pieces.

Therefore, an object of the present invention is to obviate the aforesaid difficulties of known friction pieces by providing a friction piece which has an elasticity of composite nature, so as to minimize the amplitude of vibration of the friction piece upon actuation thereof, whereby the braking power is improved. The friction piece of the present invention does not have any ridges or undulation on its contact surface.

For a better understanding of the invention, reference is made to the accompanying drawings, in which.

Figure 5A:
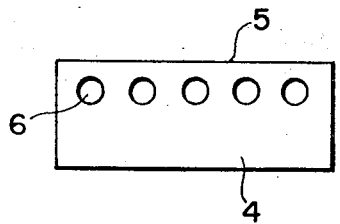
Figure 5C:
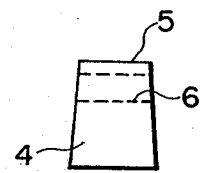
Figure 5B:
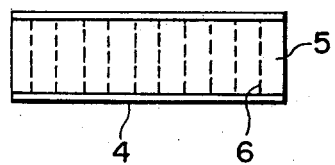
Figure 6:
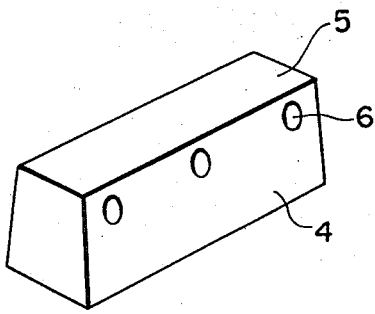
Figure 7A:
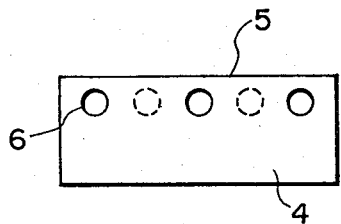
Figure 7C:
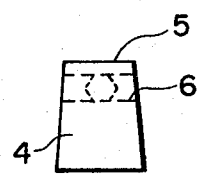
Figure 7B:
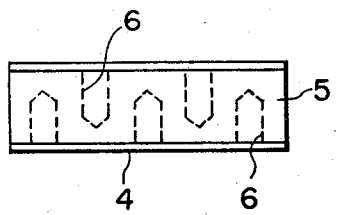

FIGS. 5A, 5B, and 5C are an elevation, a plan view, and a side view of the friction piece, respectively;

FIG. 6 is a perspective view of another friction piece according to the present invention; and FIGS. 7A, 7B, and 7C are an elevation, a plan view, and a side view of the friction piece of FIG. 6, respectively.

Figure 1A:
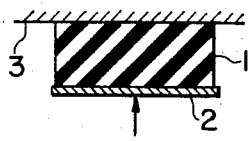
FIGS. 1A and 1B are schematic sectional views of frictional pieces for bicycle rim brakes, respectively, illustrating two different constructions of the friction piece.
Figure 1B:
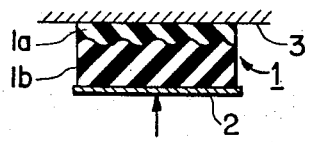
Figure 2:
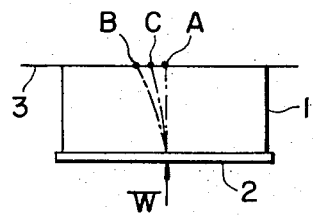
FIG. 2 is a diagrammatic illustration of the vibration of a friction piece during braking action thereof.

Referring to FIGS. 1A, 1B, and 2, a friction piece 1 for bicycle rim brake, which is supported by a base plate 2, is engageable with the inner surface of a rim 3 of the bicycle. The friction piece 1 of FIG. 1A is made of homogeneous solid material, while the friction piece 1 of FIG. 1B consists of two portions 1a and 1b made of different materials with different elastic constants, respectively.

In comparing the friction pieces of FIGS. 1A and 1B, if the material for the friction piece 1 of FIG. 1A and that for the portion 1a of the friction piece 1 of FIG. 1B are the same, the braking power of the friction piece 1 of FIG. 1A is smaller than that of FIG. 1B. The reasons for the difference of the braking power between the two constructions are as follows.

Referring to FIG. 2, if the friction piece 1 is forced to engage a rotating rim 3 by an urging force W, a certain point A on that surface of the friction piece 1, which is in contact with the rim 3, moves to a position B by the frictional force acting thereon. At the point B, the elastic stress within the friction piece 1, or the restoring force thereof, balances the frictional force acting on the point A. If the restoring force surpasses the frictional force, the point A of the friction piece 1 returns to a position C or the original stationary position of the point A. Thereafter, when the frictional force again surpasses the restoring force at the position C or A, the point A resumes its movement toward the position B. It should be noted here that the restoring force of the friction piece 1 balances a statical friction force between the rim 3 and the point A of the friction piece 1, while the frictional force acting on the point A during the return movement is a dynamical friction force therebetween. Since the dynamical friction force is usually smaller than the statical friction force, the return movement of the point A is not hampered by the dynamical friction between the friction piece 1 and the rim 3, at least in the beginning of the return movement. Thus, the point A of the friction piece 1 vibrates with an amplitude equivalent to the distance BC or BA. Similarly, all the points on the contact surface vibrates. The presence of such vibration has been known in the art.

Figure 3:
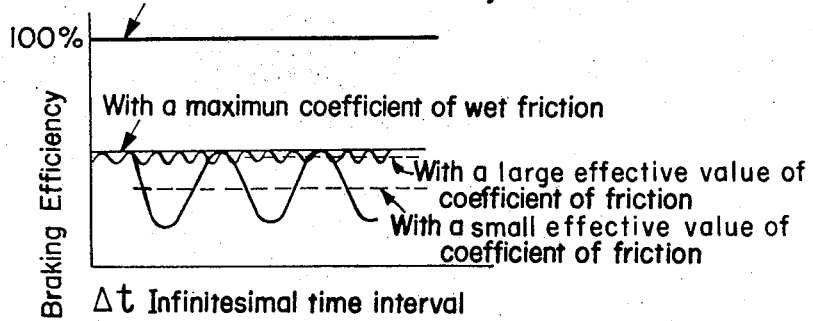
FIG. 3 is a graph of braking efficiency, illustrating the variation of the braking efficiency during infinitesimal time intervals.

The magnitude of the vibration of the friction piece depends directly on the effective coefficient of friction of the friction piece 1, as illustrated in FIG. 3. For instance, the amplitude of the vibration for a large effective value of the coefficient of friction is smaller than that for a small effective value of the coefficient of friction.

The friction piece 1 of FIG. 1B consists of two materials 1a and 1b with different elasticities. With the discontinuity of the materials, the effective value of the coefficient of friction of such composite friction piece of FIG. 1B is usually larger than that of the solid friction piece of FIG. 1A. Accordingly, the amplitude of the aforesaid vibration of the friction piece of FIG. 1B becomes smaller than that of the solid friction piece of FIG. 1A. As a result, the braking power of the friction piece of FIG. 1B is larger than that of FIG. 1A.

The degree of reduction in the frictional resistance of the friction piece 1, in response to wetting with water, depends on the shape of the frictional contact surface of the friction piece 1. Generally speaking, if a liquid material is present between the surface of rubber-like friction piece and the metal surface of the rim, the so-called hydroplane phenomenon takes place, unless some suitable measures are provided to release the trapped liquid between the contact surfaces of the friction piece and the rim. As well known to those skilled in the art, once the hydroplane phenomenon occurs, the braking power does not increase in proportion with the urging force W of the friction piece. In order to prevent the hydroplane phenomenon, conventional friction piece has undulations or drain ridges formed on the contact surface thereof. With such undulations or drain ridges, the trapped water can be drained, but the amplitude of the vibration of the friction piece increases. Thus, the increase of braking power by the drainage of trapped water is substantially cancelled by the loss of braking power by the increased vibration. As a result, the overall performance characteristics of the friction piece cannot be improved to any noticeable extent by the provision of such undulations or drain ridges.

Therefore, the present invention intends to provide a friction piece with a elasticity of composite nature without forming any undulations on the outer surface thereof, whereby the amplitude of the vibration of the friction piece upon actuation is minimized to improve the braking power thereof.

Figure 4:
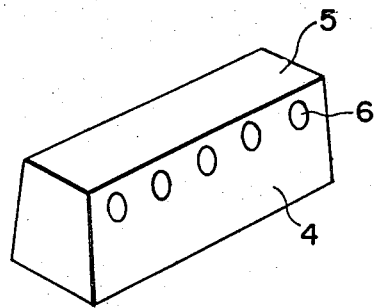
FIG. 4 is a perspective view of a friction piece according to the present invention.

FIGS. 4 to 5C illustrate a friction piece for bicycle rim brakes, according to the present invention. In the figures, a friction piece body 4 is made by shaping natural or synthetic rubber, and a plurality of lateral holes 6 are bored in parallel with each other through the body 4 in the proximity of a frictional contact surface 5, which is engageable with a bicycle rim. The lateral holes 6 are disposed at right angles to the longitudinal direction of the friction piece body 4 with uniform spacings between each other. With such lateral holes, the elasticity of the friction piece body 4 becomes composite in nature.

FIGS. 6 to 7C illustrate another friction piece body 4, according to the present invention. This friction piece is also provided with lateral holes 6, but the holes 6 do not penetrate through the body 4. More particularly, the lateral holes alternately extend from either of the two opposing longitudinal surfaces into the body 4 but terminate before reaching the opposing surface of the body 4. Thus, the lateral holes 6 of the last mentioned friction piece are disposed in a staggered fashion. With such staggered lateral holes 6, the elasticity of the friction piece body 4 of FIGS. 6 to 7C becomes composite in nature.

Thus, the friction piece of the invention consists of a uniform material from a base plate (not shown) to the frictional contact surface 5, but the elasticity of the body 4 varies in a highly complicated manner or in a composite fashion due to the presence of the lateral holes 6 underneath the frictional contact surface 5. At the same time, the contact pressure at the contact surface 5 is not uniform but varies in a complicated fashion, depending on the difference of local conditions thereof. Especially, in the case of the embodiment of FIGS. 6 to 7C, the staggered disposition of the lateral holes 6 results in a complicated distribution of the elastic constants and frictional pressure throughout the entire contact surface 5. As a result of it, the amplitude of the vibration of the friction piece during the braking action is greatly reduced, and the braking power is vastly improved, namely from the conventional 0.11–0.204G to 0.45G.

Salient features of the present invention are as follows.

i. The friction piece of the invention has a large effective value of the coefficient of friction, because the elasticity of the friction piece is of composite nature. Accordingly, the amplitude of the vibration of the friction piece is reduced so that a large braking power is ensured under both dry and wet conditions.

ii. The urging force of the friction piece is so distributed throughout the contact surface that the absolute value of the coefficient of friction of the friction piece is improved under wet conditions.

iii. The friction piece body can be formed by selecting proper material having a large frictional resistance and a high abrasion resistance. Whereby, a friction piece with a high braking efficiency and a high durability can be achieved.

What is claimed is:

1. A friction piece for bicycle rim brakes comprising a homogeneous elastically deformable rubber body having a first planar surface for engaging a bicycle rim in the braking condition and an opposed second planar surface for engaging the baseplate of the bicycle rim brakes, said body defining a plurality of transverse holes between the first and second surfaces and in the interior of the body, said holes being positioned closer to said first planar surface than to said second planar surface, said holes being spaced from each other a predetermined distance, the central axis of said transverse holes extending in a plane substantially perpendicular to the direction of the motion of the first planar surface relative to the coacting rim, said holes functioning to suppress the magnitude of the oscillatory variation of the braking action under wet conditions.

2. A friction piece according to claim 1, wherein said transverse holes penetrate through said body from one side surface to the opposing surface of said body.

3. A friction piece according to claim 1, wherein said transverse holes extend alternately from a pair of opposing surfaces into the body and terminate in the body.

4. A friction piece according to claim 1, wherein the cross-section of said body taken at right angles to the said direction of the brake surface motion relative to the rim is trapezoidal.

5. A friction piece according to claim 4, wherein said transverse holes alternately extend from opposing surfaces into the body and terminate in the body.

6. A friction piece according to claim 4 wherein said transverse holes are substantially cylindrical and are positioned in a uniformly spaced parallel relationship.

* * * * *